Sept. 6, 1955 T. BARDEEN ET AL 2,717,369
PRESSURE-SENSITIVE DEEP WELL SEISMOGRAPH DETECTOR
Filed July 31, 1952 2 Sheets-Sheet 2
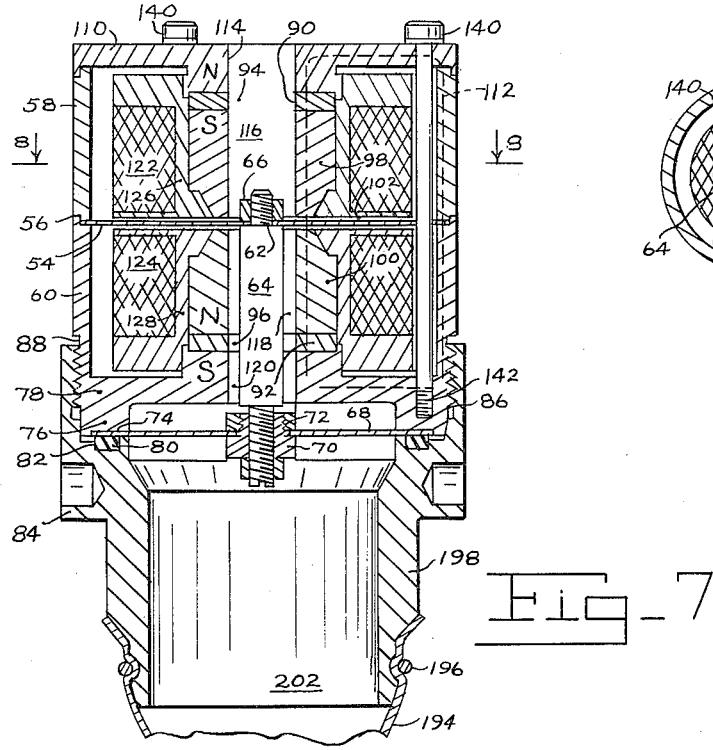
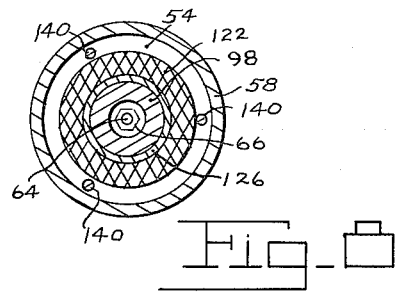
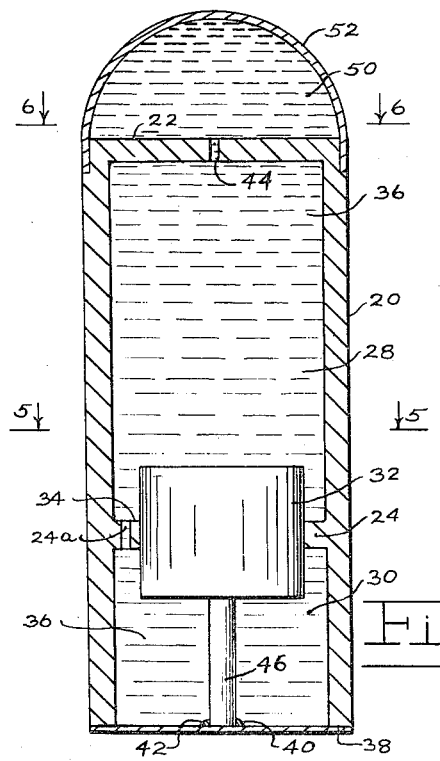
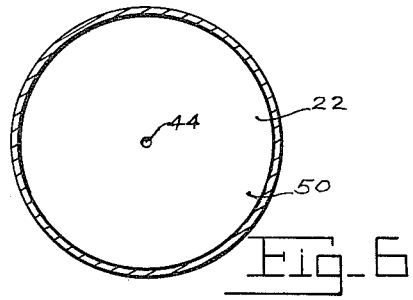
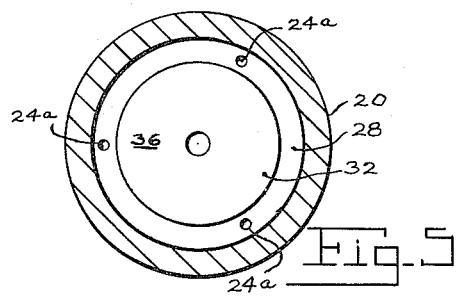
INVENTOR.
Thomas Bardeen
Roger W. Williams
BY
Their Attorney United States Patent Office 2,717,369
Patented Sept. 6, 1955

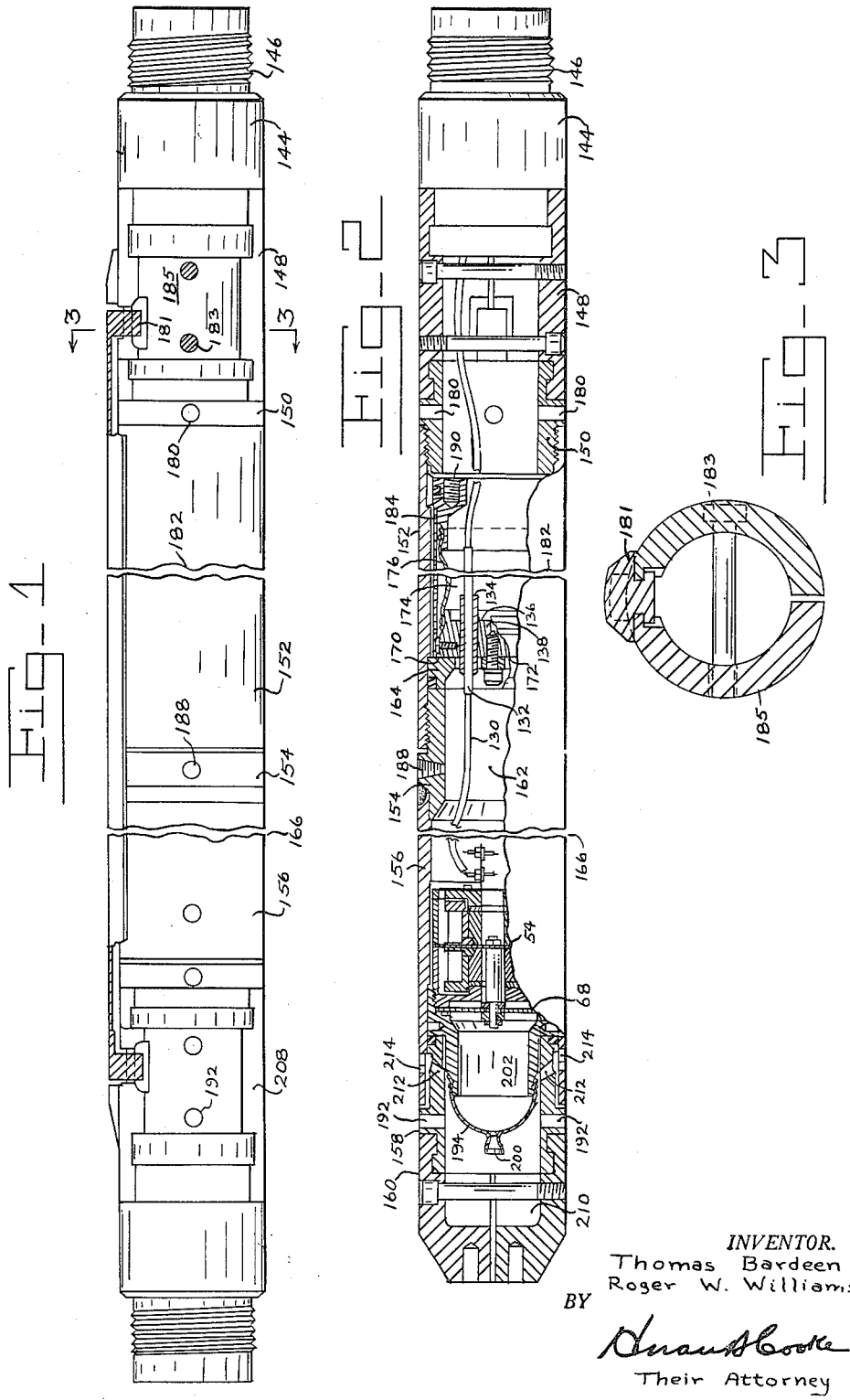

2,717,369

PRESSURE-SENSITIVE DEEP WELL
SEISMOGRAPH DETECTOR

Thomas Bardeen, Fox Chapel, and Roger W. Williams, Penn Township, Allegheny County, Pa., assignors to Gulf Research & Development Company, Pittsburgh, Pa., a corporation of Delaware Application July 31, 1952, Serial No. 301,908

3 Claims. (Cl. 340—17)

This invention relates to devices for indicating and measuring pressure variations and fluctuations in deep wells.

An object of the invention is to provide a novel and improved pressure-sensitive deep well seismograph detector device in which there is a transducer coupled to a diaphragm which is backed by a large rigid chamber filled with a compliant liquid, and which works efficiently on the pressure waves set up in the well fluid by motions of the surrounding formations.

Another object of the invention is to provide a novel and improved pressure-sensitive deep well seismograph detector device in which the pressure-responsive element is a rigid chamber containing a compressible fluid and closed off at one end by a flexible diaphragm, and arranged so that the large static pressures in a well which would normally cause excessive fluctuations of such sensitive diaphragm, are equalized and their effects thus substantially counterbalanced.

A further object of the invention is to provide a novel and improved pressure-sensitive deep well seismograph detector device which is primarily a pressure-sensitive device actuated by the pressure waves set up in the well fluid by motions of the surrounding formations, but is also inherently sensitive to accelerations which may occur when the instrument case does make good contact with the earth, being so designed that when response of this type occurs, it adds to the pressure response so that it is beneficial rather than detrimental.

Still another object of the invention is to provide a novel and improved seismograph detector device of the character described, in which there is a large rigid chamber filled with a compliant liquid acting as a backing for a transducer diaphragm, the pressure in the chamber being equalized by means of a capillary leak to a second liquid-filled chamber that is closed off by a flexible member which is subject to the well pressure.

Still a further object of the invention is to provide a novel and improved seismograph detector device of the character described, in which, in order to compensate the excessive deflections of the sensitive diaphragm caused by large static pressures in the well, a second pressure-equalizing chamber is provided, which is connected to the first-mentioned chamber by means of a capillary leak in such manner as to equalize slow pressure changes but remain unaffected by rapid pressure change due to seismic waves.

Another object of the invention is to provide a novel and improved seismic detector of the type described, in which there are two chambers in the housing of the device, a transducer being coupled to a diaphragm forming one wall of the first of said chambers and filled with a compliant liquid, the second of said chambers being connected to the first chamber by means of a capillary leak in such manner as to equalize slow pressure changes but remain unaffected by rapid pressure changes due to seismic waves, the second equalizing pressure chamber being subject to but sealed from well fluid by means of a limp flexible membrane that freely transmits well pressure to the second chamber but keeps the interior of the instrument free of well fluid, avoiding the entry of well mud which might plug up the capillary leak or contaminate the interior of the instrument.

A further object of the invention is to provide a novel and improved seismic detector of the type described, which is simple in design, relatively inexpensive to manufacture, and quite rugged, and in which the system is not made unstable by delicate balancing of forces.

These and other objects and advantages of the invention will become apparent from the following description of a preferred embodiment thereof, as illustrated in the accompanying drawings, forming a part hereof, and in which, Figure 1 is an elevational view showing a deep well seismograph detector device according to the invention, including extension means for attaching other well devices or weights below the detector;

Figure 2 is a longitudinal sectional view of the device shown in Figure 1, omitting however, the extension means illustrated in Figure 1;

Figure 3 is a sectional view taken substantially on plane 3—3 of Figure 1;

Figure 4 is a schematic diagram of the pressure geophone according to the invention;

Figure 5 is a sectional view taken substantially on plane 5—5 of Figure 4;

Figure 6 is a sectional view taken substantially on plane 6—6 of Figure 4;

Figure 7 is a sectional elevational view on a larger scale, of a portion of the device illustrated in Figure 2, showing the transducer-diaphragm assembly employed therein; and Figure 8 is a sectional view taken on plane 8—8 of Figure 7.

In making seismic studies where the geophone is placed at various depths in a deep well, it is necessary to measure the arrival time of a seismic wave. In order to make this measurement, it is desirable to have a sharp break on the seismic record when the first seismic wave arrives. In many cases, it is necessary to measure arrival times of waves traveling a horizontal path as well as those traveling a vertical path so that a deep-well geophone should obtain arrivals from any direction.

The conventional deep-well geophone uses as the sensitive element a mass on a spring, confined to move along one axis and measures the relative displacement, velocity or acceleration of the case of the geophone depending on the type of transducer used. A velocity response has been commonly used, and in order to make such geophone responsive to wave arrivals from more than one direction, three elements with their axes mutually perpendicular have been employed. Such an arrangement makes it necessary to use at least four lead wires from each geophone, adding to its complexity.

Geophone housings are made massive so that they may be lowered into a deep well containing high viscosity well fluid and the walls of the housings are normally quite thick when not pressure-equalized, in view of the high pressures existing at great depths in the fluid-filled well. The heavy mass of the housing suspended on the cable used in lowering it into the well generally makes poor dynamic coupling with the side wall of the well, and as a result, the ground motions pass through what amounts to a mechanical low-pass filter in arriving at the case of the geophone. Since the arrival wave is generally high in frequency, a considerable reduction in sensitivity normally must result from the presence of this low-pass filter action.

The deep-well pressure geophone which is described hereinbelow, according to the invention, is primarily a pressure-equalized, pressure-sensitive device that responds to the pressure waves set up in the well fluid by motions of the surrounding formations. However, in addition to this type of response, it is designed to respond to accelerations of the geophone case in a manner similar to a conventional detector. These two types of response add together in the resultant output. As a result, a number of advantages of the device over conventional geophones are evident.

Thus, there is good coupling to the side walls of the well through the well fluid, in addition to normal case-to-ground coupling. There is also good frequency response and hence sharper arrivals, the low-pass filter action of the case-to-ground coupling being circumvented. There is less noise from surface disturbances transmitted by the suspending cable and/or the well casing, and less time is needed for the geophone to become quiet after changing its level in the well.

A further advantage is the high sensitivity and better signal-to-noise ratio, resulting in a saving in the amount of explosive needed. In addition, the device is pressure-equalized, so that there is substantially no depth limitation due to danger of collapse of the case. Also, as a result of the simplified design and construction, a single transducer responds to wave arrivals from any direction, only two leads to the transducer are needed, and high pressure seals and bushings are eliminated. It is also apparent, that since only two leads are needed, two or more geophones can be used at different depths simultaneously and because of the sharper arrivals, good interval-velocity determinations can be obtained.

In order to understand clearly the nature of the invention, and the best means for carrying it out, reference may now be had to the drawings, in which like numerals denote similar parts throughout the several views.

As seen best in Figures 4, 5 and 6, there is a housing 20 shown as a hollow cylinder formed of metal or other rigid material sufficiently stiff to withstand deformation under the transient pressures which may be encountered in deep wells. The hollow cylindrical housing 20 has an end wall 22 closing one end thereof, and may have an internal partition wall 24 partly dividing the interior chamber of housing 20 into upper and lower or first and second compartments 28 and 30. However, free flow of fluid is provided for between chambers 28 and 30 by holes 24a in wall 24. The electrical transducing device generally indicated at 32, and preferably of any well-known non-rigid type, is disposed in the opening 34 formed in the partition wall 24, thus opening upon both compartments 28 and 30 in a manner later to be described in detail. The transducer 32 is connected by any suitable lead wires (not shown in this view) to electrical measuring and indicating means located at the surface of the earth above the well.

The rigid-walled housing 20 contains a compressible fluid 36, and is closed off at the lower end 38 by means of a flexible diaphragm 40 that is exposed on its outer surface 42, to the well fluid. Since the large static pressures in a deep well would cause excessive deflections of the diaphragm 40, it is necessary to equalize the static pressure on the back side of the diaphragm. This is done by means of a capillary leak 44 through end wall 22 of the upper chamber 28. Capillary leak 44 equalizes slow pressure changes, but does not equalize the rapid changes due to seismic waves. A rigid link member 46 is secured at one end of the movable element of the transducer 32, and at its other end of the diaphragm 40, so that movements of the diaphragm actuate the transducer, and through it the indicating instruments at the surface of the well. The outer or case element of the transducer 32 is rigidly connected to the partition wall 24, whereas the movable element of transducer 32 is rigidly connected to link 46.

Since the well fluid would contaminate the interior of the geophone illustrated in Figure 4, the capillary leak 44 leads to a second chamber 50, which is sealed from the well fluid by a limp membrane 52 forming a dome over the end wall 22, and which membrane freely transmits the well pressure. The choice of fluid 36 in the geophone compartments 28, 30 and 50, depends on the type of transducer used. If the transducer is very stiff, for example, piezoelectric crystals, then the fluid can be stiff. However, available crystal material is either insensitive or will not withstand the high temperatures encountered in wells. For this reason, a velocity-type of transducer 32 is preferred.

Because the dimensions of the geophone are small compared to the wave length of the seismic wave, a considerable increase in armature velocity can be obtained at the transducer by using a fluid 36 more compressible than water comprising the well fluid, a relatively large volume of fluid 36 and a small area of diaphragm 40. For shallow depths, that is, up to about 300 feet, air is an ideal fluid to use. However, in deep wells, where pressures may be in excess of 1000 or 2000 atmospheres, the volume of air will change drastically. Thus for air, the volume behind the diaphragm must be made very small and the volume of the pressure equalizing chamber relatively very large in the ratio of at least about 1000 or 2000 to 1. As the pressure increases, the stiffness of the air increases so that the sensitivity drops off with depth. Thus air is not suitable for deep-well geophones.

Liquids are available which are more compressible than water by a factor of 2 or 3. Thus, one preferred liquid for use in the compartments 28 and 30 is a Dow Corning silicone fluid of the DC–200 series, preferably one in the lower range of viscosities, such as one centistoke, for example. The value of the compressibility of the fluid will not change radically with depth due to the temperature-pressure characteristic of the silicone fluid. Hence for the same value of mechanical stiffness of fluid and hence sensitivity, the volume of the fluid chamber using silicone fluid will be 0.3 that necessary with water as the fluid. Moreover, the sensitivity will be nearly independent of depth of the well. Since the volume compression of the main chamber is small, the volume of the pressure-equalizing chamber 50 does not need to be large, and about 20 per cent of the volume of the main chamber has been found sufficient volume for chamber 50.

In order to reduce the fluid mechanical stiffness, a relatively large volume of liquid 36 is required. The mass of this liquid can act on the diaphragm 40. Accelerations of this mass can set up pressure differentials that deflect the diaphragm. As in the case of liquid pressures developed by gravitational forces, the seismic accelerations create pressures proportional to the acceleration, the liquid density and "depth" of the fluid body. For a geophone like that in Figure 4, when the seismic acceleration is momentarily downward the acceleration forces will create a decrease in pressure at the bottom of the chamber and an increase in pressure at the top of the chamber. In between there is a point of minimum or zero pressure fluctuation. For seismic waves arriving from above, the positive pressure at the wave front occurs at the moment when the wave acceleration is downward. With the diaphragm 40 at the bottom, the external acoustic pressure on the diaphragm will change in a positive sense and the internal acceleration pressure at the diaphragm will change in a negative sense. Both effects add up, tending to move the diaphragm 40 inward.

Figures 7 and 8 show a variable-reluctance type of transducer-diaphragm assembly as used in the transducer 32 geophone illustrated in Figures 1 to 3, but on a larger scale for clarity of illustration. As shown in Figure 7 there is a flexible armature 54 of magnetic material in the form of a spider with spiral arms, which is clamped at the outer diameter and between the abutting edges at 56 of the cylindrical casings 58 and 60. The armature 54 is connected at its central portion 62 by a rigid post or link member 64, the reduced upper end of which penetrates an opening in the armature, being secured in position by means of a nut 66 threaded to the upper end of the link member 64, for movement therewith. The lower end of the link member 64 is reduced and threaded so as to penetrate the central portion of the diaphragm 68, a composite nut 70 being threaded on the reduced portion of the post or link 64 and being itself upwardly reduced so as to extend through a central opening formed in the diaphragm member 68. A locknut 72 is threaded onto the upper reduced threaded portion of the composite nut 70, so as to firmly grip the diaphragm member 68 for movement with the link 64. At the same time, it is seen from Figure 7, that the marginal perimeter portion 74 of the diaphragm 68 is clamped between the annular downward-projecting portion 76 of the member 78, and a resilient annular bushing 80 disposed in an annular recess 82 formed in the interior upper surface of the lower casing member 84, the latter having an annular upstanding skirt or flange 86 by means of which it is threadedly engaged with the threads 88 formed on the lower portion of the casing 60.

There are two angular permanent magnets 90 and 92 having axial openings or bores 94 and 96 respectively, it being seen that the two bores are in axial alignment with each other and with the cylindrical annular upper and lower pole pieces 98 and 100 respectively. It is also clear from Figure 7 that the reduced lower edge of the pole piece 98 is near the reduced upper edge of the pole piece 100, so as to form an air gap 102 therebetween for the passage of magnetic flux therebetween, and that the armature 54 extends through the air gap 102, and may be normally substantially equidistant from both pole faces when in a neutral position. As the armature 54 moves with the diaphragm 68 to which it is coupled by rigid link 64, there is a variation in the effective length of the portions of the air gap 102 between each face of the armature 54 and the abutting faces of the pole pieces bordering on the air gap 102.

The annular permanent magnets 94 and 96 are formed preferably of Alnico or other similar magnetic material of high retentiveness and permanence, and are polarized as indicated by the notations "N" and "S" in Figure 7, being thus polarized vertically, in the same direction to set up flux through pole pieces 98 and 100, and members 58, 60 and 78, and the annular metallic top end piece member 110 which completes the magnetic circuit as indicated by the broken line 112. The top end piece member 110 also has an axial bore or opening 114, with its axis in alignment with the aligned bores 94 and 96 of the permanent magnets, and the aligned bores 116 and 118 through the magnetic pole pieces 98 and 100, and the bore 120 in lower end member 78.

Coils 122 and 124 are wound on non-magnetic spools 126 and 128 respectively, which are concentric with the pole pieces 98 and 100, but are disposed respectively above and below the air gap 102 as shown best in Figure 7. It is seen that the coils 122 and 124 are linked by equal magnetic flux when armature 54 is in mid-position. When the armature moves up or down, the flux in one of these coils increases and the flux in the other decreases, thereby inducing voltage in both coils. The coils are connected either in series or parallel, so that the resulting voltage or current outputs add and are delivered by wires like 130 in Figure 2, to an electrical cable that runs to amplifiers on the earth's surface. Wire 130 (Figure 2) is preferably rubber-covered for insulation purposes. A copper sleeve 132 may then be rolled onto wire 130 under pressure and soldered at 134 and 136 to form a fluid tight seal at header 138. This seal is adequate because the pressures are equal on both sides of the header.

As seen best in Figures 7 and 8, long tie screws 140 extend through openings formed in the various stacked parts of the transducer, and are threaded at their lower ends 142 into aligned recesses formed in the member 78 to hold the assembly together, it being understood however, that the central portions of the tie screws 140 extend through openings formed through the armature 54 so as to allow the armature to move freely. It is well known that variable-reluctance transducers of this and similar types produce magnetic forces in the air gaps which are in opposition to the restoring forces of the diaphragm or other spring elements in the system.

As seen best in Figures 1 and 2, the assembled device includes an upper head 144 threaded at 146 for being secured to an elevating and lowering cable not shown, and has depending from head 144, a series of tubular casing sections such as shown at 148, 150, 152, 154, 156, 158 and 160, which are secured to each other in any suitable manner as shown and illustrated, so as to define inside the resulting composite housing, various hollow areas for containing the elements illustrated. In Figure 2, the main or compression chamber 162 comprises that part of the outer wall or case sections 152, 154 and 156 running from diaphragm 68 to cap 164 and header 138. At 166, the drawing is broken, and at this point, some two or three feet of length of plain tubing 156 have been removed, so that if the drawing had not been broken at 166, and the removed tubing 156 left in, the assembled device shown in Figure 2 would be about three times as long as it is in Figure 2, and hence the chamber 162 is actually much longer than is apparent from the drawing of Figure 2, in the same proportion. This provides an adequate compliance even though the liquid filling the chamber 162 is but slightly compressible.

In this instrument, the original diaphragm stiffness is about equal to the stiffness of the fluid chamber 162, but about half of this stiffness is cancelled out by the magnetic gap forces. The spider or armature 54 is of much lower stiffness than that of the diaphragm. Thus the chamber stiffness is not objectionably modified by the diaphragm and transducer, yet the parts are rugged and the system is not made unstable by delicate balancing of forces.

The surface 170 between cap 164 and header 138 contains a spiral groove 172 which serves as a capillary leak between the main compression chamber 162 and the annular pressure-equalizing chamber 174. Shell 152 and rubber tubing membrane 176 form the walls of this equalizing chamber. Tubing 176 is thin and limp and is subject to the full pressure of the well fluid, which has free access to its interior through holes 180. At break 182 in the drawings, about six inches of length of tubing has been omitted, so that the tubing 176 would be that much longer if all of the drawings were shown at the break 182. Guard member or casing tube 184 extends around the outside of the rubber tubing 176 and other parts, so as to hold them in their proper positions, and protects the rubber tubing 176, being however perforated to allow fluid to pass therethrough freely.

The fluid in both chambers 162 and 174 is the same, and is preferably the light silicone oil previously described herein. It is injected under a slight pressure at hole 188 until both chambers 162 and 174 are full and all air is driven out at hole 190, and then plugs are threaded into both holes 188 and 190 to close them tightly. All the liquid-filled spaces are shaped so that they will not trap air during filling.

The lower side of diaphragm 68 is also subjected to the fluid pressure of the well through holes 192. However, a thin walled rubber cap 194 filled with liquid is interposed to keep well mud from contaminating the diaphragm. This cap, which is held in place by a ring 196, over the lower well extension 198 of member 84 (best seen in Figure 7), also serves to prevent air from being trapped against the diaphragm. With the instrument inverted, plug 200 in cap 194 is removed and the space 202 between the cap 194 and the diaphragm 68 is filled with silicone oil. Since this volume is relatively small, the compressibility of this liquid causes only a slight reduction of sensitivity. After filling chamber 202, plug 200 is replaced and members 158 and 160 are attached to protect cap 194 from damage. The end closure 160 may be replaced by another type of end member 208, shown in the lower part of Figure 1, which can be used for attaching other well devices or weights below the detector. Apart from this illustration of the alternative lower end member 208, Figures 1 and 2 are identical, that is they show the same device, one externally and one in section.

When the detector is first put in a well, it is important as a feature of the design, that no air can be trapped in chamber 210 at the bottom end of the device of Figure 2, since such air will rise to the highest part of the chamber and leak out through openings 212 and 214. Air trapped between the diaphragm 68 and the well fluid is most objectionable because it reduces the stiffness of the fluid through which the diaphragm must be driven. Air trapped inside the main chamber, behind the diaphragm, is less serious. It actually tends to increase the sensitivity because it makes the chamber volume more compressible. However, it causes an objectionable variation in sensitivity, since the air bubbles may become smaller and stiffer as the pressure increases with depth.

The casing sections of the detector are preferably made of thick-walled stainless-steel tubing. The rigidity of such tubing is necessary to get the desired sensitivity. Obviously, if the tubing would compress easily, the acoustic pressure inside the main chamber would rise nearly as much as the pressure outside and the response would be very low.

It is understood that the detector is not limited to any particular type of transducer, and that others than the one shown may be used. It could for example, be of the moving coil or other familiar types. However, crystals are not preferred. Because of their stiffness, crystals would require additional apparatus such as mechanical levers or other impedance-matching devices, and presently-available crystals of the more sensitive type will not stand the temperatures encountered in deep wells, as their characteristics are presently understood.

In a closed chamber of any shape, but completely filled with a liquid under pressure, there will be a pressure gradient in the direction opposite to any true acceleration force. If a pressure-sensing element is placed at the end of the chamber opposite the direction of acceleration, an increase of pressure will be noted. If it is placed at the other end, a decrease in pressure will be observed. At the midpoint or near the midpoint, the pressure will be unaffected. Thus the location can result in response ranging from zero to a maximum in either sense. Therefore, in a detector of the type described, it is important to select a location for the pressure-sensing element where the effects of external pressure fluctuations will not be offset by internal fluctuations induced in the chamber by the accelerations.

In a well detector as ordinarily used, the wave arrives from above and a positive pressure resulting from an arriving wave occurs at a time when the wave acceleration is downward. If the diaphragm is then placed well below the center of the chamber, the external acoustic pressure on the diaphragm will change in the positive sense, while the internal (acceleration) pressure at the diaphragm will change in the negative sense. Both effects add up, tending to move the diaphragm inward. If it is desired to eliminate the acceleration response component, the diaphragm may be located at a neutral point near the center, vertically, of the main chamber. The location of this neutral point may be displaced somewhat from the exact center due to dynamic effects of irregular shapes and the relative rigidities of the liquid and of the various walls of the cavity.

Results obtained in tests with the new instrument disclosed herein indicate that a big reduction can be made in the amount of explosive required, it being found that about one-fifth the size of the explosive charge is required to obtain arrivals equivalent to those obtained with heretoforeknown other forms of geophones in various areas. It has also been found that use of the new instrument considerably reduces the time required for making velocity surveys in wells. When changing the depth of the pressure-sensitive instrument disclosed herein, no time is lost in waiting for the noise level to become small.

Because of smaller charges, fewer shotholes are needed, and less time is required in reloading the shotholes. It has also been found that the rise time on seismograph records of arrival from the new pressure-sensitive instrument disclosed herein is less and hence the initial break is better. Thus more accurate time measurements can be made from the arrivals obtained with this instrument, even when the peak amplitudes are equal to those obtained with previously-known devices.

Although the invention has been described in specific terms, it is understood that various changes may be made in size, shape, materials and arrangement without departing from the spirit and scope of the invention.

What we claim as our invention is:

1. A hydrophone for use in wells, comprising a housing defining a first chamber having an opening formed therein, first flexible diaphragm means covering said opening, flexible dome means covering one face of said flexible diaphragm means for protecting the same and defining therebetween a protective hollow second chamber, liquid of low compressibility in said protective hollow chamber, aperture means formed in said flexible dome means, plug means for closing said aperture means, and gas outlet means forming an outlet for any gases trapped between said dome means and said housing, for allowing said gases to escape into said well.

2. A seismograph detector for use in a fluid-containing borehole comprising an elongate housing having a first rigid-walled chamber formed therein of substantial vertical height as compared to its transverse dimensions and having a first opening at the lower end of said first chamber, flexible diaphragm means covering said first opening to close the same, transducing means disposed in said housing and constructed and arranged for being actuated responsive to movements of said flexible diaphragm means, means defining a second chamber above said first chamber, restricted duct means including an acoustic resistance providing pressure communication between said first and second chambers, a liquid of substantially greater compressibility than water filling both first and second chambers and being flowable between said first and second chambers through said restricted duct means, and means for transmitting the pressure of the borehole fluid to the liquid in said second chamber, whereby the acoustic pressure transmitted through the borehole fluid and the inertia pressure in the liquid filling said first chamber will cause deflection of the diaphragm in the same sense in response to seismic disturbances having a component along the axis of the borehole.

3. A seismograph detector for use in a fluid-containing borehole comprising an elongate housing having a first rigid-walled chamber formed therein of substantial vertical height as compared to its transverse dimensions and having a first opening at the lower end of said first chamber, flexible diaphragm means covering said first opening to close the same, transducing means disposed in said housing and constructed and arranged for being actuated responsive to movements of said flexible diaphragm means, a volume of liquid filling said first chamber and having a total liquid volume compressibility substantially greater than the total volume compressibility imparted to the chamber by the chamber walls, means defining a second chamber above said first chamber, a liquid in said second chamber, restricted duct means including an acoustic resistance providing pressure communication between said first and second chambers, and means for transmitting the pressure of the borehole fluid to the liquid in said second chamber, whereby the acoustic pressure transmitted through the borehole fluid and the inertia pressure in the liquid filling said first chamber will cause deflection of the diaphragm in the same sense in response to seismic disturbances having a component along the axis of the borehole.

References Cited in the file of this patent

UNITED STATES PATENTS

| | | |
|---|---|---|
| 2,404,784 | Bostwick | July 30, 1946 |
| 2,413,651 | Petty | Dec. 31, 1946 |
| 2,440,903 | Massa | May 4, 1948 |
| 2,490,595 | Merten | Dec. 6, 1949 |

FOREIGN PATENTS

| | | |
|---|---|---|
| 817,640 | France | Sept. 7, 1937 |